(12) United States Patent
Kim et al.

(10) Patent No.: US 7,771,879 B2
(45) Date of Patent: Aug. 10, 2010

(54) METHOD OF PRODUCING NANOPARTICLE-FILLED PHASE INVERSION POLYMER ELECTROLYTE

(75) Inventors: Kwang Man Kim, Daejeon (KR); Young Gi Lee, Daejeon (KR); Nam Gyu Park, Daejeon (KR); Soon Ho Chang, Daejeon (KR); Kwang Sun Ryu, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1258 days.

(21) Appl. No.: 11/177,195

(22) Filed: Jul. 8, 2005

(65) Prior Publication Data

US 2006/0057464 A1  Mar. 16, 2006

(30) Foreign Application Priority Data

Sep. 10, 2004  (KR) .................. 10-2004-0072466

(51) Int. Cl.
*H01M 6/18* (2006.01)
*H01M 6/14* (2006.01)
*H01M 6/16* (2006.01)
*H01M 6/04* (2006.01)

(52) U.S. Cl. .................. 429/316; 429/303; 429/188; 429/313; 429/324

(58) Field of Classification Search .................. 429/316, 429/303, 188, 313, 324
See application file for complete search history.

(56) References Cited

U.S. PATENT DOCUMENTS

| 5,418,091 | A | | 5/1995 | Gozdz et al. |
| 5,453,101 | A | * | 9/1995 | Ong .................. 29/623.5 |
| 6,261,721 | B1 | | 7/2001 | Andrieu et al. |
| 6,669,860 | B1 | | 12/2003 | Maruyama |

FOREIGN PATENT DOCUMENTS

| JP | 2003-157719 | 5/2003 |
| KR | 1020000041210 | 7/2000 |
| KR | 1020010048897 | 6/2001 |
| KR | 1020010055897 | 7/2001 |
| KR | 1020020043945 | 6/2002 |
| KR | 10-0413801 | 12/2003 |

* cited by examiner

*Primary Examiner*—Patrick Ryan
*Assistant Examiner*—Helen O Conley
(74) *Attorney, Agent, or Firm*—Blakely, Sokoloff, Taylor & Zafman

(57) ABSTRACT

Provided is a method of producing a nanoparticle-filled phase inversion polymer electrolyte. The method includes mixing a nanoparticle inorganic filler and a polymer with a solvent to obtain a slurry; casting the obtained slurry to form a membrane; obtaining an inorganic nanoparticle-filled porous polymer membrane by developing internal pores in the cast membrane using a phase inversion method; and impregnating the inorganic nanoparticle-filled porous polymer membrane with an electrolytic solution. The polymer electrolyte produced using the method can be used in a small lithium secondary battery having a high capacity, thereby providing an excellent battery property.

11 Claims, 6 Drawing Sheets

METHOD OF PRODUCING NANOPARTICLE-FILLED PHASE INVERSION POLYMER ELECTROLYTE

BACKGROUND OF THE INVENTION

This application claims the benefit of Korean Patent Application No. 10-2004-0072466, filed on Sep. 10, 2004, in the Korean Intellectual Property Office, the disclosure of which is incorporated herein in its entirety by reference.

1. FIELD OF THE INVENTION

The present invention relates to a method of producing a solid electrolyte for a battery, and more particularly, to a method of producing a nanoparticle-filled porous polymer electrolyte using a phase inversion method.

2. DESCRIPTION OF THE RELATED ART

Porous separation membranes composed of polyethylene or polypropylene are used in lithium ion secondary batteries commercialized as small power supplies for information communication devices, such as mobile phones. Transfer of lithium ions is performed by a liquid electrolytic solution containing lithium salts. Since these batteries use the liquid electrolytic solution, outer housings, such as metal cans are used as containers of the batteries. The use of the metal cans interferes with production of lighter batteries. Further, since the electrolytic solution generally uses non-aqueous, polar and volatile solvents, the use of the electrolytic solution has a lack of safety due to side reactions of the solvents with electrode materials.

To overcome these problems, lithium ion polymer secondary batteries were suggested and there has been a trial to commercialize them. To reduce the disadvantages of an electrolytic solution, a polymer electrolyte membrane prepared by impregnating a polymer membrane with a liquid electrolyte is used in the polymer secondary batteries. Since the liquid is located in internal pores of the solid polymer and plays a role to transfer lithium ions, it is advantageous in view of safety.

Polymer electrolytes use porous polymer membranes obtained by dissolving a polymer matrix in a solvent to obtain a slurry, casting the slurry to form a membrane and drying the membrane to remove the solvent. Sizes and distributions of the pores formed on a surface of the polymer membrane or in the polymer membrane may depend on the type of the solvent used and drying conditions. The formed pores can have a great effect on electrochemical properties of the polymer electrolyte, such as a degree of impregnation of electrolytic solution, a transference number of lithium cations, etc.

For the polymer electrolyte to successfully exhibit an excellent performance when applied to small lithium secondary batteries having a high energy density and a high capacity, the polymer membrane should have high mechanical strength, stability for a long time, thermal stability, resistance to chemicals, etc. and the polymer electrolyte membrane obtained by adding the electrolytic solution to the polymer membrane should have high ion conductivity, transference number of lithium cations, electrochemical stability, etc.

In the casting method, a polymer electrolyte having a relatively low porosity, i.e., having a dense structure on or in the membrane may be obtained, and thus, remarkably improved impregnation of the electrolytic solution, conductivity of lithium ions, interfacial resistance to a lithium electrode cannot be accomplished.

To obtain a polymer membrane in which pores are developed without using the casting method, U.S. Pat. No. 6,669, 860 (registered on Dec. 30, 2003, and entitled with "Solid electrolyte, electrochemical device, lithium ion secondary battery, and electric double-layer capacitor" by Satoshi Maruyama et al.) describes a method of producing a polymer electrolyte having a relatively high porosity using a phase inversion technique.

A conventional polymer electrolyte still has problems that an electrolytic solution leaks when an electrode sheet is combined with the electrolyte and that the electrolyte has a high interfacial resistance to the electrode sheet. To overcome these problems, when producing a polymer electrolyte, there has been a trial to increase a mechanical strength of the polymer electrolyte membrane, ion conductivity, and an interfacial compatibility with a lithium electrode by using a predetermined amount of filler. However, the polymer electrolyte has a relatively low porosity, and thus, remarkably improved impregnation of the electrolytic solution, conductivity of lithium ions, interfacial resistance to a lithium electrode, etc. cannot be accomplished.

Accordingly, a polymer electrolyte having relatively high internal porosity and mechanical strength is required.

SUMMARY OF THE INVENTION

The present invention provides a method of producing a polymer electrolyte for a lithium secondary battery, the polymer electrolyte having improved physical property, such as mechanical strength, improved electrochemical property, such as ion conductivity, high compatibility with a lithium metal electrode, and improved battery performances.

The present invention also provides a polymer electrolyte produced by dissolving a polymer matrix and a nanoparticle inorganic filler in a solvent to obtain a slurry, casting the slurry, and applying a phase inversion method to the cast slurry, and a method of producing the polymer electrolyte.

According to an aspect of the present invention, there is provided a method of producing a polymer electrolyte, comprising: mixing a nanoparticle inorganic filler and a polymer with a solvent to obtain a slurry; casting the obtained slurry to form a membrane; obtaining an inorganic nanoparticle-filled porous polymer membrane by developing internal pores in the cast membrane using a phase inversion method; and impregnating the inorganic nanoparticle-filled porous polymer membrane with an electrolytic solution.

The polymer may be a vinylidene fluoride (VdF) polymer or a copolymer of vinylidene fluoride (VdF) with hexafluoropropylene (HFP) in a powder form and is added to the solvent and milled to be mixed with the solvent.

The filler may be silica or titania nanoparticle and is dispersed in the solvent before the polymer is added to the solvent.

The solvent may comprise N-methyl-2-pyrrolidone (NMP).

The filler may be silica nanoparticle, the solvent may be NMP, and the amount of the filler added to the solvent may be about 5-50% by weight, based on a total weight of the polymer and the filler.

The filler may be titania nanoparticle, the solvent may be NMP, and the amount of the filler added to the solvent may be about 4-60% by weight, based on a total weight of the polymer and the filler.

The solvent may comprise dimethylacetamide.

The filler may be silica nanoparticle, the solvent may be dimethylacetamide, ant the amount of the filler added to the solvent may be about 5-50% by weight, based on a total weight of the polymer and the filler.

The filler may be titania nanoparticle, the solvent may be dimethylacetamide, and the amount of the filler added to the solvent may be about 30-60% by weight, based on a total weight of the polymer and the filler.

The obtaining of the porous polymer membrane may comprise impregnating the cast membrane with flowing water immediately after the casting of the slurry.

According to the present invention, by using a copolymer of vinylidene fluoride (VdF) with hexafluoropropylene (HFP) as a polymer matrix and silica ($SiO_2$) or titania ($TiO_2$) nanoparticle as a filler, and after forming a porous polymer membrane using a phase inversion method, impregnating the porous polymer membrane with an electrolytic solution in which a lithium salt is dissolved, a polymer electrolyte for a lithium secondary battery, having improved physical property, such as mechanical strength, improved electrochemical property, such as ion conductivity, high compatibility with a lithium metal electrode, and improved battery property can be produced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
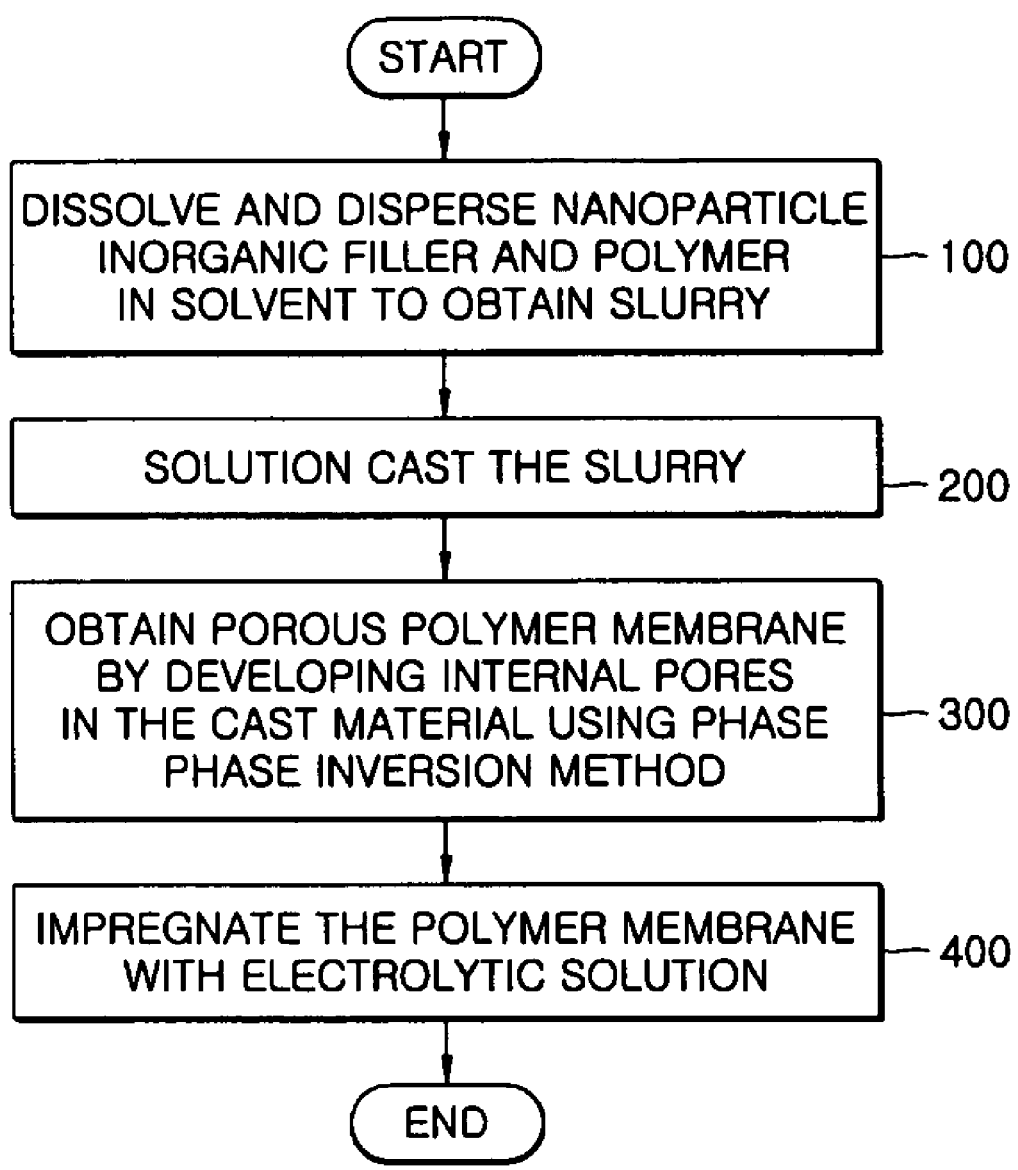
FIG. 1 is a flow chart illustrating a method of producing a polymer electrolyte according to an embodiment of the present invention.

Hereinafter, embodiments of the present invention will be described in more detail.

In an embodiment of the present invention, a polymer electrolyte for a lithium secondary battery is produced using a phase inversion method. For example, a predetermined amount of a nanoparticle inorganic filler having a particle diameter in a nanometer level is added to a specific polymer material and then, the mixture is dissolved in a solvent to obtain a slurry. Then, the obtained slurry is cast and immediately after the casting, the cast material is impregnated with a non-solvent to obtain a porous polymer electrolyte having highly developed pores on a surface of the membrane and in the membrane. Thus, the highly porous polymer electrolyte is produced using a phase inversion method.

More specifically, in order to produce the phase inversion polymer electrolyte for a lithium secondary battery, first, a copolymer of vinylidene fluoride (VdF) with hexafluoropropylene (HFP), i.e., a P(VdF-HFP) copolymer, in a powder form is prepared. The P(VdF-HFP) copolymer powders and silica ($SiO_2$) or titania ($TiO_2$) nanoparticle are dissolved and dispersed in the solvent to obtain a slurry. The obtained slurry is cast using a solution casting method and then immediately, the solution-cast is impregnated with the non-solvent which is continuously flowing or is flushed out from a container, to obtain a polymer membrane. The obtained polymer membrane is impregnated with an electrolytic solution containing a lithium salt in an organic solvent for a predetermined time and then, dried to obtain a polymer electrolyte.

The present application is continued to the descriptions of Korean Patent Registration Nos. 353867 (registered on Sep. 10, 2002, and entitled with "Polymer electrolyte for lithium secondary battery" by Kwang Man Kim et al.) and 373325 (registered on Feb. 25, 2002, and entitled with "Polymer electrolyte filled with titania nanoparticles and the preparation thereof", by Kwang Man Kim et al.) in which the inventor of the present application participated. These Korean Patents suggest a method of improving development of pores in a polymer electrolyte by using a phase inversion method when producing the polymer electrolyte using a P(VdF-HFP) polymer matrix and silica or titania as a filler. By adding the filler, an ion conductivity can be increased and an interfacial resistance with lithium can be reduced.

The polymer used in an embodiment of the present invention may be a vinylidene fluoride (VdF) polymer or a copolymer of vinylidene fluoride (VdF) with hexafluoropropylene (HFP), i.e., a P(VdF-HFP) polymer. The P(VdF-HFP) polymer may have a content of HFP of about 12 mol %. The inorganic filler may be fumed silica or titania, i.e., oxide of titanium ($TiO_2$), in a powder form which has an average particle diameter in several nanometers or several tens of nanometers.

The solvent or cosolvent for the mixture of the polymer and the filler may be N-methyl-2-pyrrolidone (NMP). In this case, the amount of silica used may be 5-50% by weight and the amount of titania used may be 4-60% by weight, based on a total weight of the polymer and the filler. When the solvent is dimethylacetamide (DMA), the amount of silica used may be 5-50% by weight and the amount of titania used may be 30-60% by weight, based on a total weight of the polymer and the filler.

When the solvent is NMP, if the amount of silica is less than 5% by weight and/or the amount of titania is less than 4% by weight, based on a total weight of the polymer and the filler, the impregnation amount of the polymer electrolytic solution is not sufficient and thus, the ion conductivity cannot be increased, and further a mechanical strength cannot be increased. When the solvent is NMP, if the amount of silica is greater than 50% by weight and/or the amount of titania is greater than 60% by weight, based on a total weight of the polymer and the filler, the silica and titania control the physical property of the polymer electrolyte and a membrane cannot be easily formed, and thus, the mechanical strength cannot be increased. When the solvent is DMA, if the amount of titania is less than 30% by weight, based on a total weight of the polymer and the filler, a viscosity of the slurry is relatively too low and a flowability of the slurry after the casting is too high, and thus, a shape of the cast membrane cannot be easily maintained and a uniform membrane cannot be easily obtained.

In addition to NMP or DMA, acetone, tetrahydrofuran, or etc. can be used as the solvent used in an embodiment of the present invention. Preferably, NMP and/or DMA is used.

The electrolytic solution used in an embodiment of the present invention may be a mixture of any one of various lithium salts with an organic solvent. Examples of the lithium salts include $LiClO_4$, $LiBF_4$, $LiAsF_6$, $LiPF_6$, $LiCF_3SO_3$, or $LiN(CF_3SO_2)_2$, etc. Examples of the organic solvent include ethylene carbonate (EC), propylene carbonate, dimethyl carbonate (DMC), diethyl carbonate, ethylmethyl carbonate), or mixtures thereof.

Preferably, the lithium salt is $LiPF_6$. Preferably, the organic solvent is a mixture of EC with DMC. A concentration of the lithium salt in the electrolytic solution may be 1 mole per liter of the electrolytic solution, i.e. 1M. When the organic solvent is used as a mixture, the concentration of each of the organic solvents in the mixture is not specifically limited.

Production of the polymer electrolyte according to the embodiment of the present invention using the materials described above can be obtained as illustrated in FIG. 1.

FIG. 1 is a flow chart illustrating a method of producing a polymer electrolyte according to an embodiment of the present invention.

Referring to FIG. 1, in the method of producing a polymer electrolyte, a nanoparticle inorganic filler and a polymer is dissolved and dispersed in a solvent to obtain a slurry (operation 100). Specifically, first the inorganic filler in a powder form is added to a predetermined amount of the solvent and stirred. To uniformly disperse the nanoparticle inorganic filler in the solvent, the stirring is performed using an ultrasonic wave for about 30 minutes or more.

Next, for example, a P(VdF-HFP) polymer having a content of HFP of, preferably, about 12 mol %, in a powder form is slowly added to the resultant product and Zr-balls having a diameter of 5 mm are added in a content of 60% by volume or more, based on the total liquid phase, and then ball-milled for about 24 hours to obtain a slurry.

Then, the slurry is cast using a solution casting method (operation 200). Specifically, after the milling, the slurry is placed into a vacuum oven and the remaining pores in the slurry are removed for 5 minutes under a reduced pressure. Then, a predetermined amount of the slurry is poured on a clean plate, such as a glass plate, and solution-cast to a predetermined thickness with a doctor blade apparatus. Thus, the slurry is cast to form a membrane.

After the casting, the cast material is subjected to a phase inversion method to obtain a porous polymer membrane having highly developed internal pores (operation 300). Specifically, immediately after the casting, the glass plate on which the slurry is cast is impregnated with water flowing in a water bath at a predetermined flow rate, for such a sufficient time that a polymer membrane can be formed. Then, the cast material is removed from the water bath and dried at room temperature for 2 days to obtain a phase inversion polymer membrane.

At this time, the introduced water is a non-solvent for the polymer, etc. When the glass plate on which the slurry is cast is impregnated with water flowing in the water bath at a predetermined flow rate as described above, a behavior that the solvent remained in the cast material (or the cast membrane), i.e., an inorganic nanoparticle-filled porous matrix will diffuse from the cast material to its outside competes with a behaviour that the non-solvent (i.e., water) will penetrate into the polymer matrix in order to solidify the polymer, in the cast material. As a result, due to these two behaviours, a polymer membrane having highly developed pores is obtained. It can be understood that the phase inversion method is substantially applied to the production of the polymer having a high porosity.

The obtained polymer membrane is impregnated with an electrolytic solution to obtain a polymer electrolyte (operation 400). Specifically, the obtained polymer membrane is placed in an ultra-low humidity chamber with a dew point maintained at −40° C. and impregnated with an electrolytic solution containing a lithium salt for 20 hours or more. Then, the polymer membrane impregnated with the electrolytic solution is removed and the electrolytic solution on a surface of the polymer membrane is wiped with filter paper. Then, the polymer membrane is left for about 4 hours in the ultra-low humidity chamber and the desired polymer electrolyte is obtained.

Hereinafter, the polymer electrolyte according to an embodiment of the present invention will be described in more detail with reference to the following Examples. Polymer electrolytes according to Examples and polymer electrolytes according to Comparative Examples are prepared using materials and compositional ratios listed in Table 1.

TABLE 1

Production of phase inversion membrane and solution-cast membrane

| Solvent Type of filler | | NMP | | | | DMA | | | |
|---|---|---|---|---|---|---|---|---|---|
| Membrane | | Silica | | Titania | | Silica | | Titania | |
| forming method | | Solution casting | Phase inversion | Solution casting | Phase inversion | Solution casting | Phase inversion | Solution casting | Phase inversion |
| Content of filler (% by weight) | 0 | Comparative Example 1 | Example 1 | Comparative Example 1-1 | Example 1-1 | c | c | c | c |
| | 5 | Comparative Example 2 | Example 2 | Comparative Example 6 | Example 8 | Comparative Example 13 | Example 15 | c | c |
| | 10 | Comparative Example 3 | Example 3 | Comparative Example 7 | Example 9 | Comparative Example 14 | Example 16 | c | c |
| | 20 | Comparative Example 4 | Example 4 | Comparative Example 8 | Example 10 | Comparative Example 15 | Example 17 | c | c |
| | 30 | Comparative Example 5 | Example 5 | Comparative Example 9 | Example 11 | Comparative Example 16 | Example 18 | Comparative Example 17 | Example 21 |
| | 40 | a | Example 6 | Comparative Example 10 | Example 12 | a | Example 19 | Comparative Example 18 | Example 22 |
| | 50 | a | Example 7 | Comparative Example 11 | Example 13 | a | Example 20 | Comparative Example 19 | Example 23 |

TABLE 1-continued

Production of phase inversion membrane and solution-cast membrane

| Solvent | NMP | | | | DMA | | | |
|---|---|---|---|---|---|---|---|---|
| Type of filler | | | | | | | | |
| Membrane | Silica | | Titania | | Silica | | Titania | |
| forming method | Solution casting | Phase inversion | Solution casting | Phase inversion | Solution casting | Phase inversion | Solution casting | Phase inversion |
| 60 | b | b | Comparative Example 12 | Example 14 | b | B | Comparative Example 20 | Example 24 |

EXAMPLES 1 THROUGH 7

Each of specimens according to Examples 1 through 7 described in Table 1 was prepared as follow. Silica nanoparticles (Cab-O-Sil TS-530, available from Cabot Co., U.S.A.) as an inorganic filler, in an amount described in Table 1, were added to a 100 ml glass sample bottle containing about 9 g of NMP as a solvent. Then, the silica nanoparticles were dispersed in the solvent using an ultrasonic wave generator set to an output amplitude of 35 W, with repeating cycles for 30 minutes, each cycle including application of the ultrasonic wave for 30 sec and stopping of the ultrasonic wave for 5 sec.

Next, 1 g of P(VdF-HFP) polymer powders having a content of HFP of 12 mol % (KynarFlex 2801, available from Atofina Chemical Corp., U.S.A.) was slowly added to the resultant dispersion and Zr-balls having a diameter of 5 mm were added in a content of 60% by volume or more based on the liquid phase, and then sealed and ball-milled at a speed of 500 rpm for 24 hours to obtain a slurry. The amounts of the polymer and the silica added are described in Table 1.

After the ball milling, a cap of the sample bottle was allowed to be loose and placed in a vacuum oven for 5 minutes under a reduced pressure, thus defoaming the slurry. The slurry was washed with methanol and a predetermined amount of the slurry is poured on a dry glass plate and cast with a doctor blade to obtain a thin membrane sheet. A doctor blade gap was maintained at 400 mm. Immediately after the casting, the glass plate on which the thin membrane was cast was placed in a water bath in which water is flowing at a predetermined flow rate, and maintained until the polymer membrane is solidified. The polymer membrane was removed from the water bath and dried at room temperature for 24 hours to obtain a desired polymer membrane.

In an ultra-low humidity lab with a dew point maintained at −40° C., the dried polymer membrane was cut to a predetermined size and immersed for 20 hours or more in a schale containing an access amount of an electrolytic solution obtained by dissolving 1M $LiPF_6$ in a mixture of EC and DMC in a weight ratio of 1:1, for impregnation. After the impregnation, the polymer electrolyte membrane was removed from the electrolytic solution and then, sandwiched between two sheets of filter paper and patted to wipe off the electrolytic solution on a surface of the polymer membrane. Then, the polymer membrane is left for about 4 hours in a ultra-low humidity chamber and the desired phase inversion polymer electrolyte specimen was obtained.

COMPARATIVE EXAMPLES 1 THROUGH 5

Each of polymer electrolytes was produced using the same manner as in Examples 1 through 7, except that the glass plate on which the thin membrane was cast was dried in a oven at about 70° C. for 2 hours and the dried thin membrane was removed from the glass plate at room temperature, according to a conventional solution casting method. When the thin membrane could not be easily removed from the glass plate due to a strong attachment to the glass plate, methanol was sprayed on the attached thin membrane and it was removed from the glass plate, and then, again dried in a oven at about 70° C. for 12 hours to obtain a polymer membrane having a thickness of about 36-50 mm. The subsequent impregnation process was performed using the same manner as in Examples 1 through 7.

EXAMPLES 8 THROUGH 14

Each of polymer electrolytes was produced using the same manner as in Examples 1 through 7, except that titania (PC-101, available from Titan Industry Co., Japan) was used in place of silica as a filler.

COMPARATIVE EXAMPLES 6 THROUGH 12

Each of polymer electrolytes was produced using the same manner as in Comparative Examples 1 through 5, except that titania (PC-101, available from Titan Industry Co., Japan) was used in place of silica as a filler.

EXAMPLES 15 THROUGH 20

Each of polymer electrolytes was produced using the same manner as in Examples 1 through 7, except that DMA was used in place of NMP as a solvent.

COMPARATIVE EXAMPLES 13 THROUGH 16

Each of polymer electrolytes was produced using the same manner as in Comparative Examples 1 through 5, except that DMA was used in place of NMP as a solvent.

EXAMPLES 21 THROUGH 24

Each of polymer electrolytes was produced using the same manner as in Examples 1 through 7, except that titania (PC-101, available from Titan Industry Co., Japan) was used in place of silica as a filler and DMA was used in place of NMP as a solvent.

COMPARATIVE EXAMPLES 17 THROUGH 20

Each of polymer electrolytes was produced using the same manner as in Comparative Examples 1 through 5, except that titania (PC-101, available from Titan Industry Co., Japan) was used in place of silica as a filler and DMA was used in place of NMP as a solvent.

In each of the specimens described in Table 1, a weight ratio of the solvent to the polymer matrix is about 9:1 and the polymer membrane is self-supporting type.

For compositions "a" in Table 1, the content of the polymer matrix is too low, and thus, when the polymer membrane is formed, a binding force between the nanoparticles filled in the polymer membrane is too weak and, after drying, the membrane is fragile and as a result, a self-supporting membrane cannot be formed. For compositions "b" in Table 1, since an excess amount of nanoparticles filled in the polymer membrane, a solid content is too high such that the mixture of the polymer and the filler cannot be liquefied, and thus, a polymer membrane cannot be formed. Contrary to this, for compositions "c" in Table 1, since the slurry has such a low viscosity that the slurry cannot be cast, owing to a low viscosity of the solvent DMA, a self-supporting membrane cannot be formed.

The results of measuring the properties of the membranes obtained in Examples 1 through 24 and Comparative Examples 1 through 20 will now be described. In the phase inversion membranes obtained in Examples 1 through 24 according to embodiments of the present invention, volatilisation of the solvent and penetration of the non-solvent into the membrane for solidification of the polymer ompete with each other during the formation of the membrane, thereby obtaining highly developing internal pores. Cross-sections of solution-cast membranes and phase inversion membranes, wherein, for example, NMP is used as a solvent and 10% by weight of silica is used as a filler, were observed using scanning electron microscope (SEM) photos, illustrated in FIGS. 2 and 3.

Figure 2:
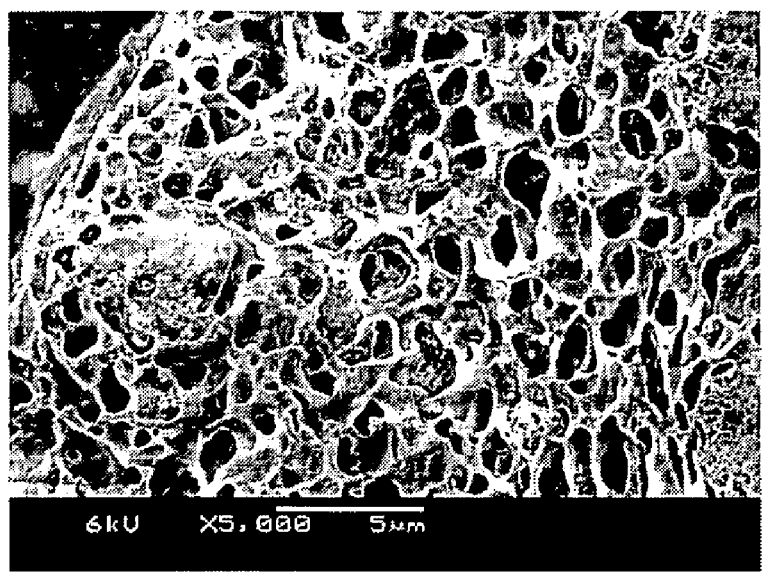
FIG. 2 is a scanning electron microscope (SEM) photo of a cross-section of a porous polymer membrane formed using an phase inversion method according to an embodiment of the present invention.
Figure 3:
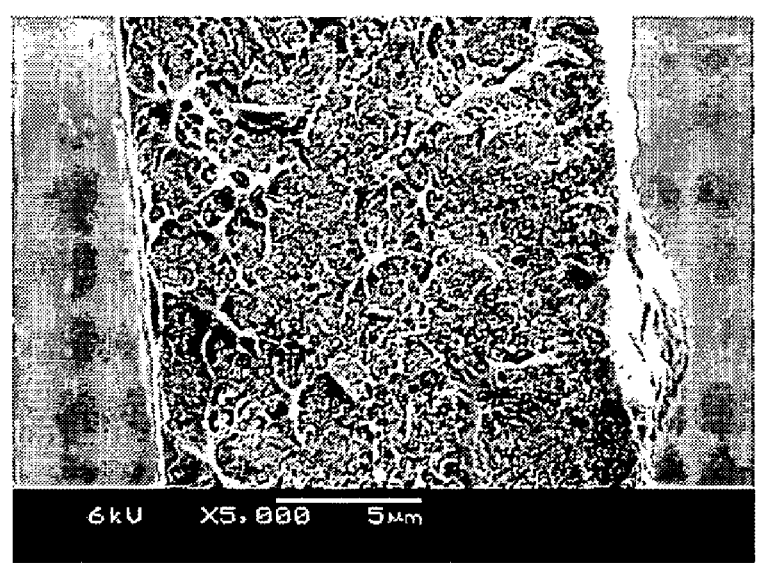
FIG. 3 is an SEM photo of a cross-section of a porous polymer membrane formed using a conventional solution casting method.

FIG. 2 is an SEM photo of a cross-section of a porous polymer membrane formed using a phase inversion method according to an embodiment of the present invention. FIG. 3 is an SEM photo of a cross-section of a porous polymer membrane formed using a conventional solution casting method.

Referring to FIG. 2, the phase inversion membrane produced using a method according to an embodiment of the present invention has a relatively highly developed internal pores. Contrary to this, referring to FIG. 3, the conventional solution-cast membrane has a dense internal structure. High porosity can have a great effect of improving an electrochemical property of the polymer electrolyte. This fact can be demonstrated by determining a degree of impregnation of the electrolytic solution and ion conductivity of the polymer electrolyte.

First, the determination of the degree of impregnation of the polymer electrolyte will now be explained.

The degree of impregnation of the polymer electrolyte is calculated from the following equation:

$$\text{Degee of impregnation}(\%) = (W_2 - W_1)/W_1 \times 100$$

wherein $W_1$ represents a weight of a polymer membrane before being impregnated with an electrolytic solution, and $W_2$ represents a weight of the polymer membrane after being impregnated with the electrolytic solution and wiped with filter paper.

Graphs of the degrees of impregnation of the membranes obtained in Examples 1 through 24 and Comparative Examples 1 through 20 are shown in FIGS. 4 through 7. An electrolytic solution obtained by dissolving 1M $LiPF_6$ in a mixture of EC and DMC in a weight ratio of 1:1 was used.

Figure 4:
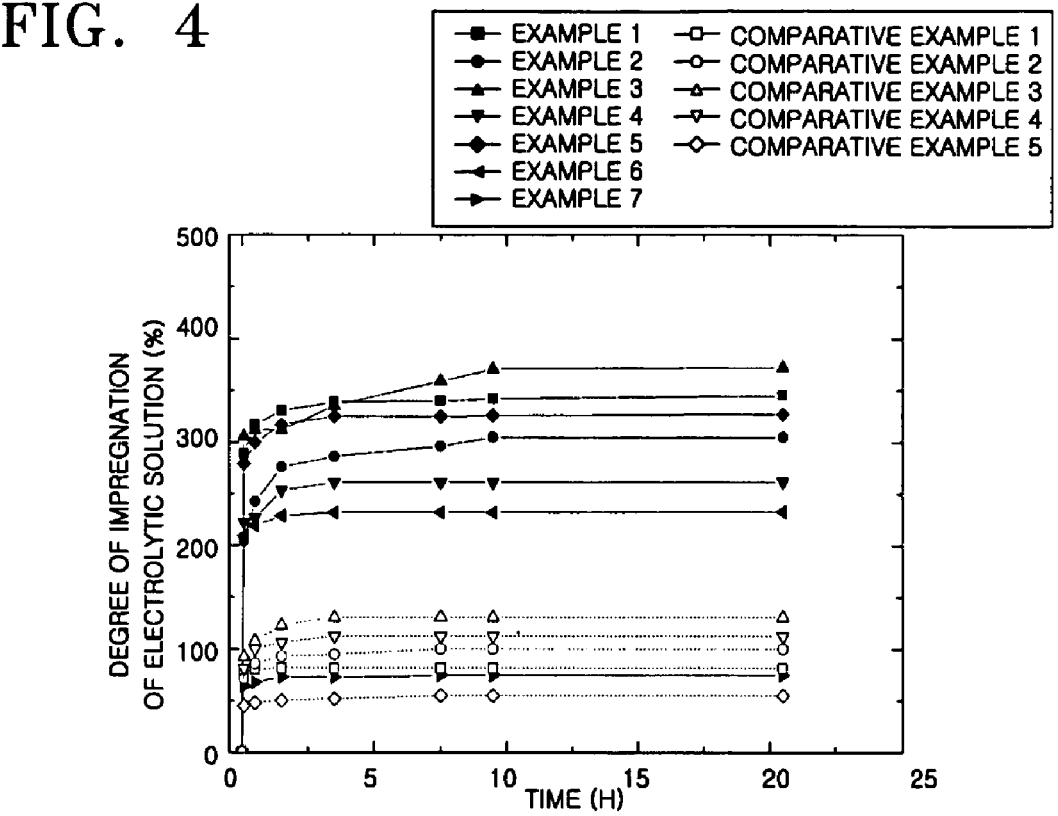
FIGS. 4 through 7 are graphs illustrating improved degrees of impregnation of electrolytic solution into nanoparticle-filled porous polymer electrolytes obtained by using a phase inversion method according to an embodiment of the present invention.
Figure 5:
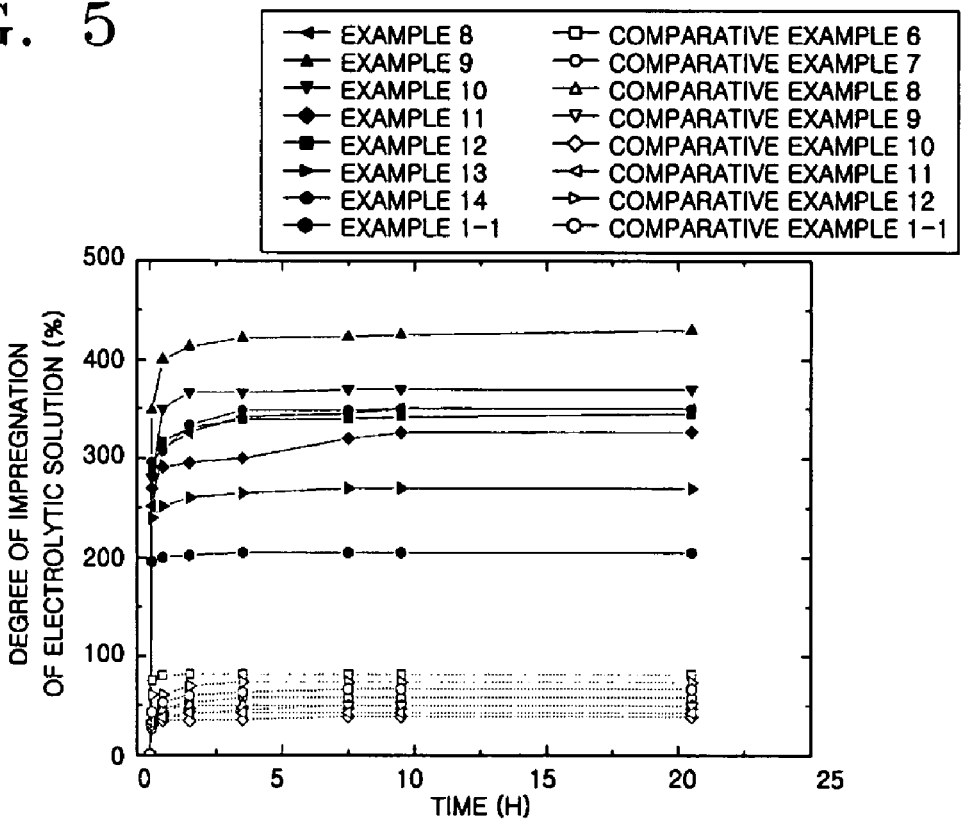
Figure 6:
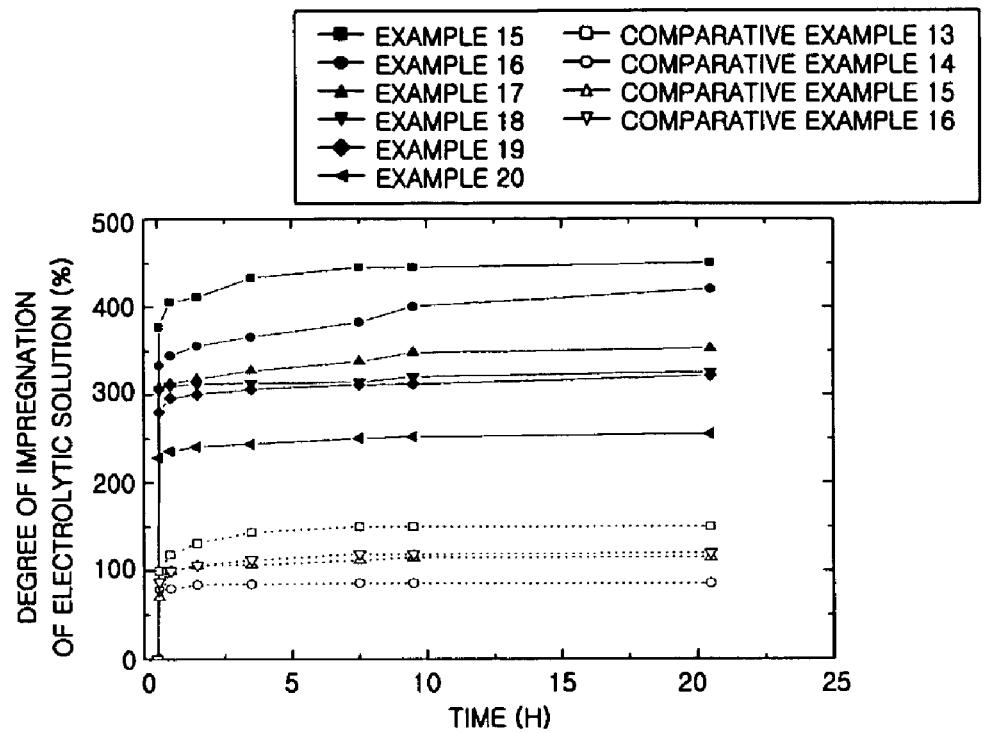
Figure 7:
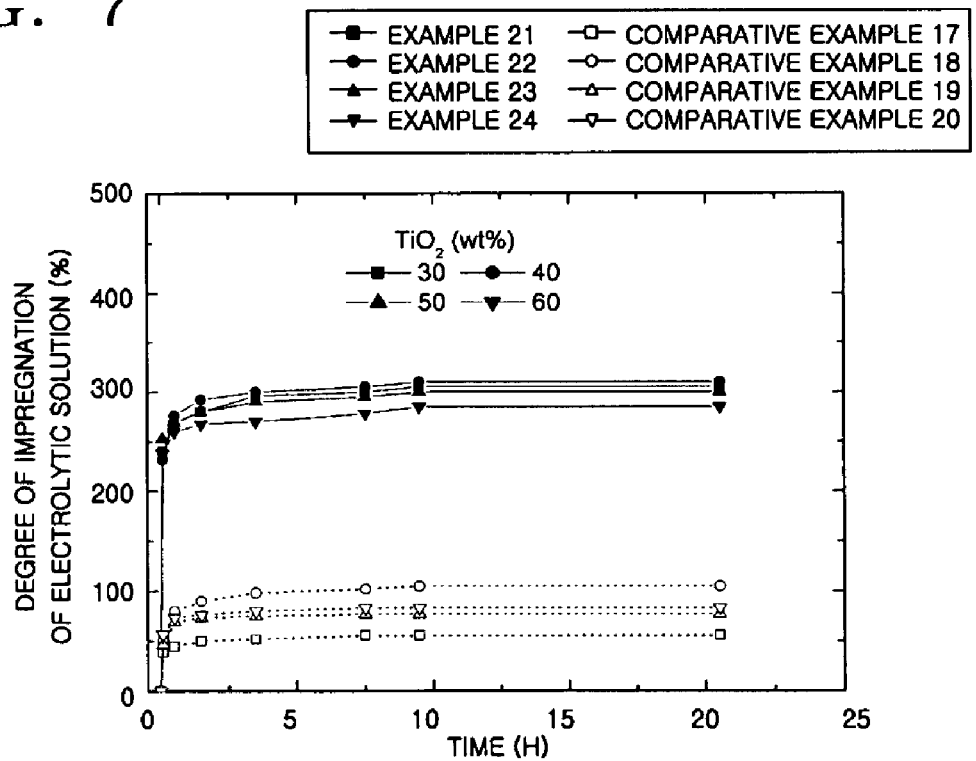

FIG. 4 is a graph of degrees of impregnation of the electrolytic solution into phase inversion membranes and solution-cast membranes, both membranes being obtained by using NMP as a solvent and silica as a filler. FIG. 5 is a graph of degrees of impregnation of the electrolytic solution into phase inversion membranes and solution-cast membranes, both membranes being obtained by using NMP as a solvent and titania as a filler. FIG. 6 is a graph of degrees of impregnation of the electrolytic solution into phase inversion membranes and solution-cast membranes, both membranes being obtained by using DMA as a solvent and silica as a filler. FIG. 7 is a graph of degrees of impregnation of the electrolytic solution into phase inversion membranes and solution-cast membranes, both membranes being obtained by using DMA as a solvent and titania as a filler.

Referring to FIGS. 4 through 7, it was confirmed that the phase inversion membranes have still higher degrees of impregnation of the electrolytic solution than the solution-cast membranes. These high degrees of impregnation are resulted from the developed internal pore structures in the phase inversion membranes. Particularly, when NMP was used as a solvent, the degrees of impregnation of the phase inversion membranes were about 400% greater than those of the solution-cast membranes. Such high degrees of impregnation can have a great effect on an ion conductivity and an electrochemical ion transfer property of the polymer electrolyte.

The electrochemical ion transfer property can be evaluated by measuring the ion conductivity.

The results of measuring the ion conductivity of the specimens obtained in Examples 1 through 24 and Comparative Examples 1 through 20 are shown in FIGS. 8 through 11. An electrolytic solution obtained by dissolving 1 M $LiPF_6$ in a mixture of EC and DMC in a weight ratio of 1:1 was used. The ion conductivity was measured as follows. The polymer electrolyte membrane was cut to a size of 2 cm×2 cm, and sandwiched between two electrode sheets composed of stainless steel and each having a size of 2 cm×2 cm. Then the ion conductivity was measured at various temperatures according to a conventional method of measuring impedance. The results are shown using an Arrhenius plot.

Figure 8:
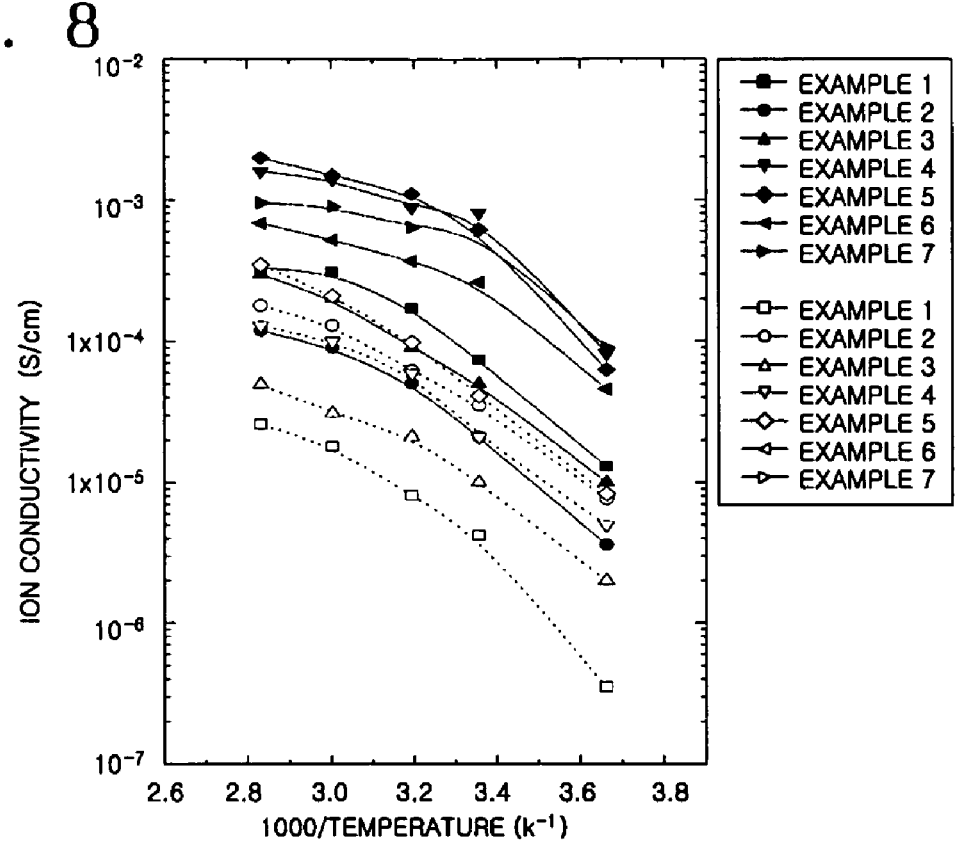
FIGS. 8 through 11 are graphs illustrating improved ion conductivities of nanoparticle-filled porous polymer electrolytes obtained by using a phase inversion method according to an embodiment of the present invention.
Figure 9:
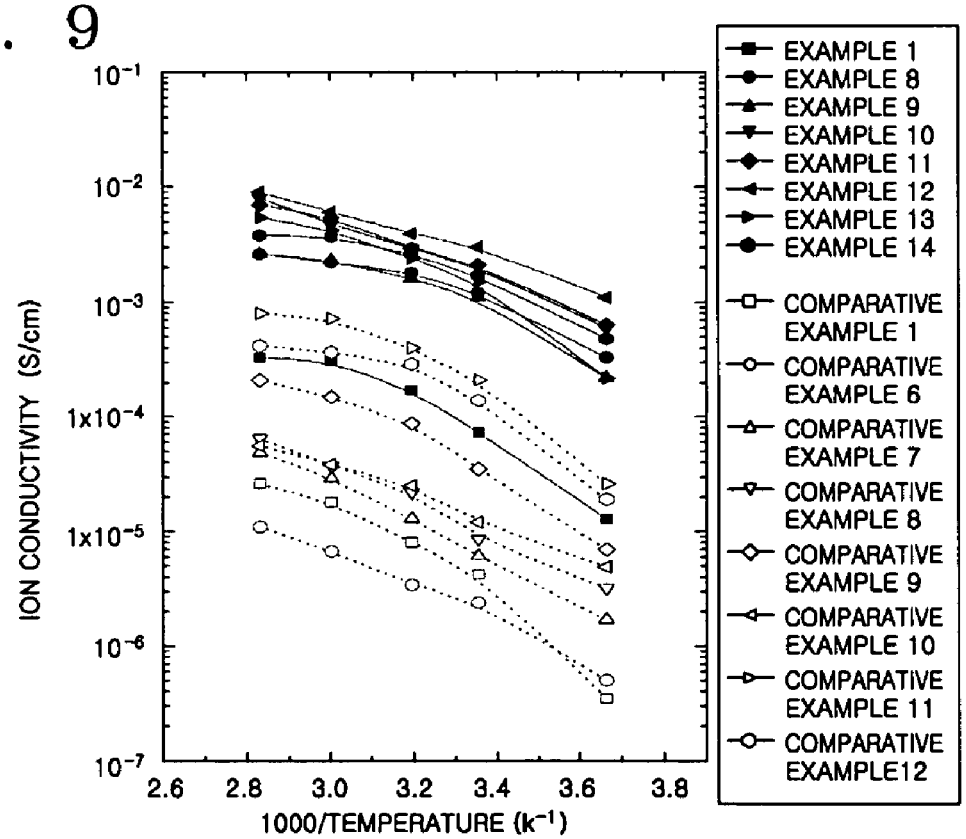
Figure 10:
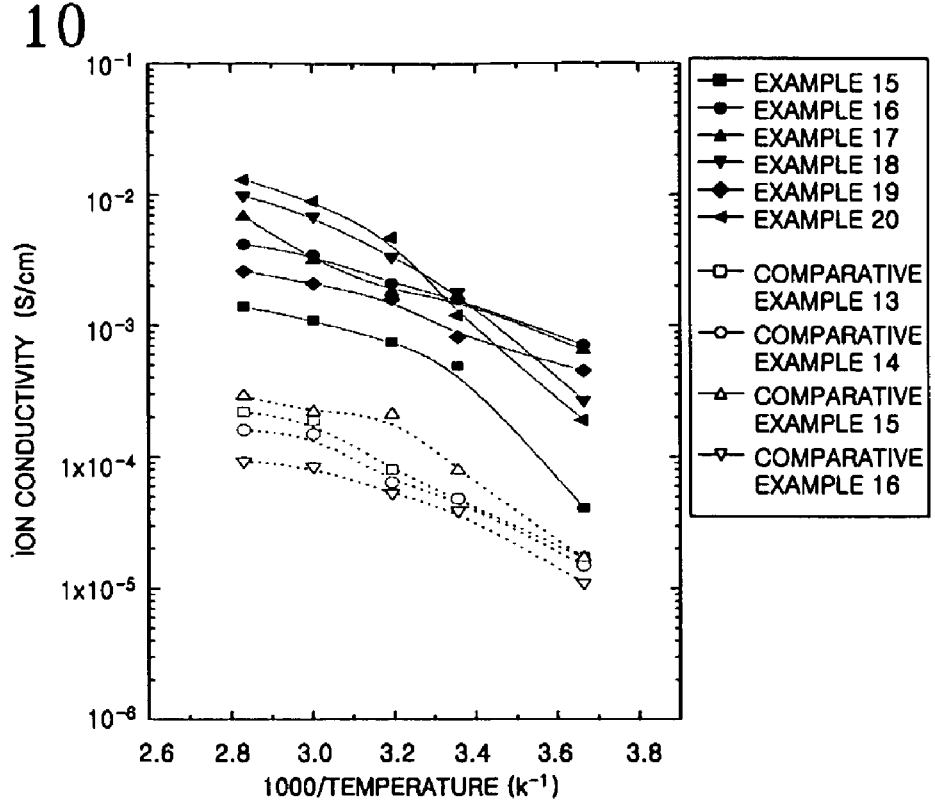
Figure 11:
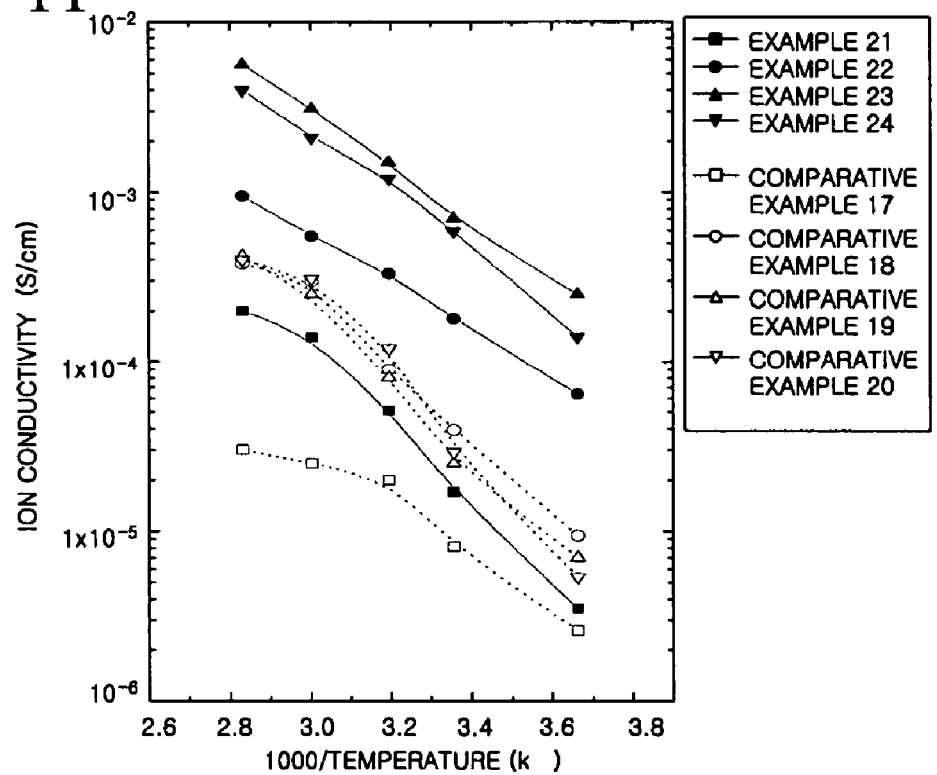

FIG. 8 is a graph of ion conductivities of phase inversion membranes and solution-cast membranes, both membranes being obtained by using NMP as a solvent and silica as a filler. FIG. 9 is a graph of ion conductivities of phase inversion membranes and solution-cast membranes, both membranes being obtained by using NMP as a solvent and titania as a filler. FIG. 10 is a graph of ion conductivities of phase inversion membranes and solution-cast membranes, both membranes being obtained by using DMA as a solvent and silica as a filler. FIG. 11 is a graph of ion conductivities of phase inversion membranes and solution-cast membranes, both membranes being obtained by using DMA as a solvent and titania as a filler.

Referring to FIGS. 8 through 11, it was confirmed that the phase inversion membranes have higher ion conductivities than the solution-cast membranes by about $10^1$-$10^2$ S/cm or more, except for several membranes. It can be presumed that increases in the degrees of impregnation due to the developed pore structures in the phase inversion membranes were reflected to these high ion conductivities.

According to the present invention, a polymer electrolyte can be produced, which is interposed between an anode electrode and a cathode electrode in a lithium secondary battery to separate the two electrodes from each other and which can efficiently transfer lithium ions, thereby allowing a battery reaction to be maintained in a good manner.

A nanoparticle-filled phase inversion polymer electrolyte produced according to the present invention has still more developed internal pores than a polymer electrolyte membrane used for a conventional lithium ion polymer secondary battery, thereby increasing a degree of impregnation of an electrolytic solution and accordingly, ion conductivity, and decreasing interfacial resistance to a lithium metal electrode. Thus, it is expected that the nanoparticle-filled phase inversion polymer electrolyte will be most favorably used in a lithium metal polymer secondary battery to be developed in the future.

Further, since a polymer electrolyte according to the present invention is filled with a nanoparticle inorganic filler, it can be formed as a self-supporting polymer membrane having an increased mechanical strength and have micropores formed and dispersed therein. These micropores can reinforce the internal pore structure developed by using the phase inversion method. As a result, the polymer electrolyte according to the present invention can absorb a large amount of the electrolytic solution and ensure an excellent maintenance of the electrolytic solution, due to the more developed pore structure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of producing a polymer electrolyte, comprising:
    mixing a nanoparticle inorganic filler and a polymer with a solvent to obtain a slurry, wherein the nanoparticle inorganic filler is dispersed in the solvent before the polymer is added to the solvent;
    casting the obtained slurry to form a membrane, wherein said casting includes placing the slurry into a vacuum to remove pores from the slurry under a reduced pressure prior to depositing the slurry onto a surface to form the membrane;
    obtaining an inorganic nanoparticle-filled porous polymer membrane by developing internal pores in the cast membrane using a phase inversion method; and
    impregnating the inorganic nanoparticle-filled porous polymer membrane with an electrolytic solution.

2. The method of claim 1, wherein the polymer is a vinylidene fluoride (VdF) polymer or a copolymer of vinylidene fluoride (VdF) with hexafluoropropylene (HFP) in a powder form and is added to the solvent and milled to obtain the slurry.

3. The method of claim 2, wherein the filler is a silica nanoparticle.

4. The method of claim 1, wherein the solvent comprises N-methyl-2-pyrrolidone (NMP).

5. The method of claim 4, wherein the filler is silica nanoparticle, the solvent is NMP, and the amount of the filler added to the solvent is about 5-50% by weight, based on a total weight of the polymer and the filler.

6. The method of claim 4, wherein the filler is titania nanoparticle, the solvent is NMP, and the amount of the filler added to the solvent is about 4-60% by weight, based on a total weight of the polymer and the filler.

7. The method of claim 1, wherein the solvent comprises dimethylacetamide.

8. The method of claim 7, wherein the filler is silica nanoparticle, the solvent is dimethylacetamide, ant the amount of the filler added to the solvent is about 5-50% by weight, based on a total weight of the polymer and the filler.

9. The method of claim 7, wherein the filler is titania nanoparticle, the solvent is dimethylacetamide, and the amount of the filler added to the solvent is about 30-60% by weight, based on a total weight of the polymer and the filler.

10. The method of claim 1, wherein the obtaining of the porous polymer membrane comprises impregnating the cast membrane with flowing water immediately after the casting of the slurry.

11. The method of claim 2, wherein the filler is titania nanoparticle and is dispersed in the solvent before the polymer is added to the solvent.

* * * * *